UNITED STATES PATENT OFFICE.

ALEXANDER SCHWARCMAN, OF BUFFALO, NEW YORK, ASSIGNOR TO SPENCER KELLOGG & SONS, INC., OF BUFFALO, NEW YORK, A CORPORATION OF NEW YORK.

PROCESS OF TREATING PYROXYLIN AND PRODUCTS THEREOF.

1,323,792.  Specification of Letters Patent.  Patented Dec. 2, 1919.

No Drawing.  Application filed March 29, 1919.  Serial No. 286,095.

*To all whom it may concern:*

Be it known that I, ALEXANDER SCHWARCMAN, a citizen of the United States, residing at Buffalo, in the county of Erie and State of New York, have invented certain new and useful Improvements in Processes of Treating Pyroxylin and Products Thereof, of which the following is a specification.

This invention relates to processes of treating pyroxylin and products thereof; and it comprises a method of obviating or lessening the ready inflammability of pyroxylin (nitrated cellulose) by incorporating more or less chlorin, or another halogen into the molecule, as by dissolving pyroxylin in methyl alcohol or the like, adding carbon tetrachlorid and a chlorin carrier, such as zinc chlorid or tin chlorid, and chlorinating to a desired degree, the material being thereafter washed and neutralized; and it also comprises as a new material a substance having the general properties of nitrocellulose or pyroxylin as regards solubility in various solvents, film forming properties and the like but distinguished from ordinary pyroxylin by being comparatively uninflammable and containing more or less chlorin, or another halogen, such as bromin or iodin in the molecule; all as more fully hereafter set forth and as claimed.

Pyroxylin is nitrated cellulose, being distinguished from gun cotton by the fact of containing a less amount of nitrogen and being of greater solubility in most solvents. It is used as a basis for plastic compositions such as celluloid, varnishes and many other purposes where its plasticity and film-forming properties are valuable. Being a nitro product however of the general nature of gun cotton it is of course readily inflammable and this fact militates against its uses in many relations where its other properties make it eminently desirable as in making aeroplane dopes, celluloid articles, etc. Very many propositions have been made for lessening this inflammability by incorporating into compositions containing pyroxylin greater or less amounts of bodies which are incombustible. Zinc chlorid, calcium chlorid, magnesium chlorid and other saline additions are often used, these materials being incombustible and hygroscopic, that is able to take up moisture from the air. A varnish film containing magnesium chlorid, for example, attracts a little moisture on its surface and is less inflammable. To the extent that these foreign bodies are present however, and particularly where hygroscopic bodies are employed the valuable properties of the pyroxylin composition are usually lessened.

It is the purpose of the present invention to produce a better material as regards resistance to flame and to this end instead of incorporating fireproofing material in mechanical admixture with pyroxylin I incorporate fireproofing materials into the molecule; that is I change the pyroxylin itself so as to make it slow burning. To do this I chemically combine the pyroxylin with more or less chlorin, producing chlorinated compounds. Pyroxylin so treated is still a nitrocellulose with the usual valuable film forming and plastic properties, but it is also a chlorinated substance. The nitro groups in its molecule make it inflammable but the presence of chlorin tends to make it uninflammable. The two effects balance out more or less. I may use less or greater amounts of chlorin but in general I aim to incorporate between 5 and 8 per cent. With less than 5 per cent. for some purposes, the composition is somewhat too inflammable while incorporation of a greater amount than 8 per cent. is generally not worth while. Instead of using chlorin I may use bromin and with advantage although the cost of the final material is somewhat increased thereby. The atomic weight of bromin being much greater than that of chlorin a greater weight of bromin can be added to the nitrocellulose molecule with a given halogenation than of chlorin.

I find it better to chlorinate the pyroxylin while in solution as I get more regular results than by a direct treatment of dry pyroxylin with chlorin. The solvent used in such a solution should include at least one liquid material containing chlorin and comparatively insusceptible to the effects of free chlorin or bromin. Carbon tetrachlorid is a very good body for this purpose. In itself it is not a solvent of pyroxylin but it can be mixed with pyroxylin solutions in other solvents. A good solution may be made by dissolving commercial pyroxylin in methyl alcohol containing, say 5 per cent. of acetone and diluting this solution largely with carbon tetrachlorid. Into the mixture chlorin may be led until the desired amount of action is obtained. Under the influence of chlorin the methyl alcohol is also chlorinated but it is converted into volatile products which can be readily removed. The pyroxylin dissolved in such a mixture of solvents takes up chlorin readily in chlorination. Treatment with chlorin is carried on till a substantial amount of chlorin is taken up. Instead of using chlorin I may use bromin. In chlorination it is advisable to have a chlorin carrier, such as zinc chlorid or tin chlorid present. After chlorination to the desired extent, the solvents and excess of chlorin may be removed by evaporation and the chlorinated pyroxylin washed, neutralized and dried in the usual manner. It will be found freely soluble in the usual solvents of pyroxylin. It can be colloided with camphor, etc., to make the usual celluloid-like compositions; dissolved in amyl acetate, etc., to make varnishes and in general handled like the original pyroxylin, the chlorination or bromination not having substantially changed its properties in this respect. But the plastic articles or varnish films produced are much less inflammable than similar products made with the original pyroxylin. Solutions of the new material will stand considerable dilution with various non-solvents for pyroxlin such as benzol, benzine, turpentine, etc., without precipitation. Solutions of the new material form good clear films on paper, wood, metal and glass which are permanent in their character and which do not readily inflame. The new materials are not hygroscopic. The new materials are particularly suitable in making flame resisting dopes for aeroplane wings and like purposes.

What I claim is:—

1. The process of reducing the inflammability of pyroxylin which comprises treating the same with a halogen until a substantial amount of said halogen is chemically taken up by the material.

2. The process of reducing the inflammability of pyroxylin which comprises treating the same with a halogen in the presence of a solvent for said pyroxylin and of carbon tetrachlorid, the treatment being continued until a substantial amount of said halogen is chemically taken up by the material.

3. As a new composition of matter pyroxylin containing a substantial amount of a halogen chemically united therewith.

4. As a new composition of matter pyroxylin containing a substantial amount of chlorin chemically united therewith.

In testimony whereof, I affix my signature hereto.

ALEXANDER SCHWARCMAN.